United States Patent [19]
Campbell et al.

[11] Patent Number: 5,542,448
[45] Date of Patent: Aug. 6, 1996

[54] LATCH ATTACHMENT PREVENTING CHRONIC LEAKAGE

[76] Inventors: Raymond J. Campbell, 22207 Wetherburn, Kata, Tex. 77449; Al Nall, Jr., 13403 Brodbridge La., Houston, Tex. 77082; R. Terry Oates, P.O. Box 87, Trinity, Tex. 35862

[21] Appl. No.: 282,876

[22] Filed: Jul. 29, 1994

[51] Int. Cl.⁶ .................. F16K 31/24; F16K 31/26; F16K 33/00
[52] U.S. Cl. .................. 137/410; 4/324; 4/415; 137/416; 137/426; 137/432; 137/434; 137/441
[58] Field of Search .................. 4/415, 324, 434, 4/435; 137/426, 430, 432, 434, 442, 443, 444, 410, 416, 420, 441; 251/73, 74

[56] References Cited

U.S. PATENT DOCUMENTS

| | | | |
|---|---|---|---|
| 4,027,693 | 6/1977 | Thompson | 137/426 |
| 4,082,110 | 4/1978 | Woodbury, Jr. | 137/426 |
| 4,286,619 | 9/1981 | Straus | 137/426 |
| 4,327,941 | 5/1982 | Schoepe | 137/441 |
| 4,700,413 | 10/1987 | Lopez | 137/426 |
| 5,211,204 | 5/1993 | Mikol | 137/426 |
| 5,232,011 | 8/1993 | Royalty | 137/426 |
| 5,280,803 | 1/1994 | Swift | 137/426 |
| 5,287,882 | 2/1994 | Mikol | 137/426 |

*Primary Examiner*—George L. Walton
*Attorney, Agent, or Firm*—Gunn & Associates

[57] ABSTRACT

An attachment for float operated valves in a water closet of commode is set forth. In the water closet, the rising water on filling moves a floating bulb or ring which is connected with an arm. The adapter of this invention includes a mounting ring for attachment, a mounting post supported by the ring, and a rotatable hanging pendulum which supports a locking shoulder wherein the shoulder hooks the arm moved by the float. That prevents leakage after the water closet has been filled. On flushing, a chain connects to the flush mechanism so that the hanging pendulum and locking shoulder are pulled from the arm to permit float operation.

18 Claims, 2 Drawing Sheets

LATCH ATTACHMENT PREVENTING CHRONIC LEAKAGE

BACKGROUND OF THE DISCLOSURE

The present disclosure is directed to an attachment which is incorporated to limit water drainage which occurs with chronic leakage. More particularly, it is an attachment which affixes to the equipment located in a water closet or chest, referring to the chamber which holds a charge of water above a typical or conventional bowl in a commode installation. A charge of water is normally accumulated in the water closet. The charge of water measures several gallons, typically in the range of 2–3 gallons. The total water discharge per operation can measure as much as 7 gallons and as little as 2 gallons. This is controlled by the normal operation of the equipment. There is, however regrettably, an abnormal detriment to operation. Sometimes, there will be chronic or continual leakage. After draining of the water closet, the refilling cycle charges the water closet to a specified height determined by a float. A typical, rather well known system uses a float bulb appended to the end of a long arm or lever. As the water rises, the bulb is raised with it and operates the arm to turn off a valve. The charge of water stored in the water closet is held indefinitely. There is the risk of leakage. When leakage occurs, water continues to dribble at a small rate out of the water closet and ultimately to the sewer system. It is unused water. In fact, it can be very wasteful. Moreover, the waste of water can be chronic because the water closet operates to be refilled. Rather than filling only once at the time of operation, continued refilling will occur. This recycle is a result of leakage replacement. This refilling can be very wasteful. Depending on the rate of leakage, a chronic leak can require refilling with perhaps 50 to 100 gallons of water per day in a leaky water closet. Because it is a leak that is not seen, there is no drumming of a falling drop of water that might be heard from a kitchen faucet. That leak can be seen or heard. In this particular instance, nothing is seen and the leak may well be substantially silent. In that circumstance, the leakage can continue indefinitely, thereby frustrating the use of the equipment and wasting substantial quantities of water.

The leakage that occurs in this particular situation is particularly difficult to detect because leakage continues indefinitely. Moreover, the equipment in the water closet operates automatically to refill the water closet to a required level. The float bulb is raised to accomplish this.

When such leakage does occur it is chronic and continuous. When such leakage does occur it continues with substantial loss, especially when the leakage rate becomes great. Since the equipment incorporates a relatively inexpensive flapper valve into, the bowl from the water closet, leakage is not uncommon.

The present disclosure is a mechanism which is adapted to be fitted onto pre-existing equipment. It is particularly used for the water closet valve controlled mechanism used in filling the water closet. The most common type installation utilizes a bulb affixed to the end of a long arm. As the water level comes up, the bulb is floated upwardly, thereby operating the equipment. The present equipment is an adapted which can be fitted on that type of mechanism. There is another type mechanism. Rather than using a laterally extending arm mounting a floatable bulb, this uses a donut shaped ring. The donut ring is buoyant (as is the bulb) and is raised vertically. It is tethered by virtue of fitting the ring around an upstanding post. The ring and cooperative post jointly define a mechanism which monitors water level through the buoyancy of the floating ring. In this particular version, a laterally extending arm is also operated. In effect, both types of devices use laterally extending arms which respond to a buoyant float. Moreover, the buoyant float, whether a bulb or ring, is raised and lowered on the surface of the water which movement is conveyed to the mechanism through or by means of a connected arm. The arm operates a valve mechanism which terminates the large influx of water in the ordinary operation of the equipment.

One aspect of the present disclosure is the incorporation of two different embodiments which use the same mounting collar. Moreover, the present invention cooperates with this mounting collar to position a latch for the float operated valve mechanism. Recalling the float either is a bulb or hollow donut, an arm is operated which senses the rising water level and which opens or closes a valve to fill the water closet. Water volume is monitored through arm movement. The value apparatus is interdicted by the disclosed system so that the arm is locked temporarily in position. Thus when the water closet is drained completely, the float responds to filling by raising the float, thereby transferring motion from the float to the valve. The arm can be locked in the up position associated with complete filling. This prevents subsequent refilling (even at a very slow rate) as typically occurs when the water closet is slowly drained by small leaks in the system. The apparatus of the present disclosure is an accessory which can be incorporated on new or old equipment to provide that function.

The apparatus of the present disclosure catches the float operated arm as it moves upwardly. The arm is caught and held until later release of the water. Then, the float is free to fall because the arm is moved out of the grasp of the present apparatus. On refilling, the arm is caught again so that the device automatically resets after each intentional operation.

In one aspect, the present apparatus incorporates a mounting collar which appends to the valve mechanism above the water line. It incorporates a latch which grabs the extending arm joined to the float. This arm is thereafter held in a latched position and is not free to move downwardly until intentionally released. On latch rotation, release occurs.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may add to other equally effective embodiments.

DETAILED DESCRIPTION OF THE PREFERRED EMBODIMENTS

Figure 1:
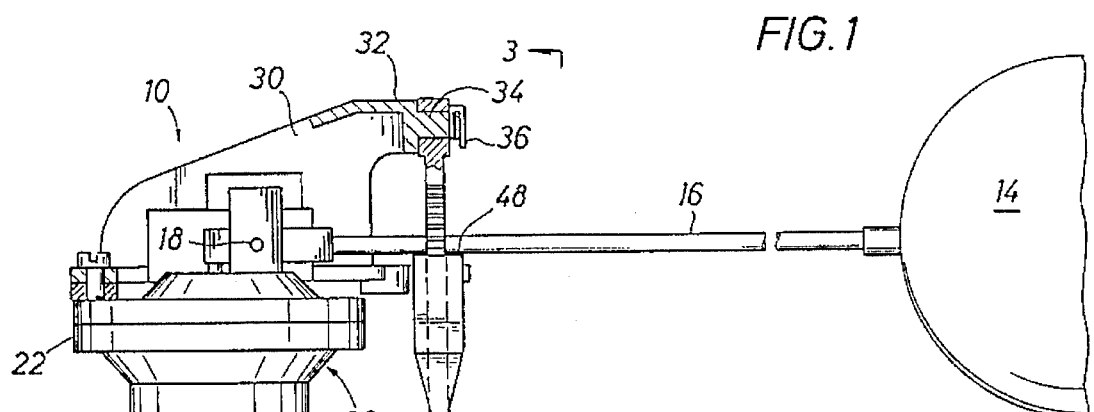
FIG. 1 is a side view of a water closet valve mechanism mounted on an upstanding water conduit which incorporates a valve operated by a bulb connected to an arm wherein the present invention is affixed to the upper end and catches the arm to hold the arm in an elevated position signifying filling of the water closet.

Attention is first directed to FIG. 1 of the drawings where the present invention is identified by the numeral 10 and is affixed to a pre-existent valve and water pipe mechanism in a water closet. That apparatus will be described first to provide the context of the present invention 10. Accordingly, FIG. 1 shows a fill pipe 12 which extends upwardly in a water closet to fill to a specified water level. Filling is sensed by a floating hollow bulb 14 which is appended to the end of a long arm 16. The arm is rotatably mounted to rotate around a pivot pin 18. A valve 20 is operated by the arm 16. Water is introduced from the pipe 12 and flows through the valve 20 to fill the water closet. As the arm 16 is rotated, the valve is ultimately closed and water admission is stopped. As a generalization, that is all that occurs when the equipment operates properly. Discharge of the water closet however requires delivery of many gallons through a flapper valve. Leakage in that area does often occur. When leakage occurs, the water level in the tank drops and that drop is sensed by the floating bulb 14. When that occurs, the bulb 14 responds in the intended fashion, opening the valve 20 slightly and refilling the tank. Chronic leakage can waste substantial quantities of water. That leakage is prevented by the advent of the present apparatus.

The valve 20 is typically constructed with a peripheral flange 22. The flange enables the assembly of the valve 20 at the time of manufacture and serves as a mounting location for the apparatus 10 of the present invention. This structure therefore utilizes a substantially circular ring 24. As shown in the plan view of FIG. 2 of the drawings, the ring is provided with multiple holes 26 which are incorporated to enable the ring to be mounted. For this particular common embodiment, three of the mounting holes are required. Additional mounting holes are included which connect differently on different models or types of valve mechanisms. As a generalization, the ring 24 is constructed so that it can be properly aligned with the equipment, and is fastened with bolts 28 in the fashion illustrated. The bolts 28 are used to join the flange 22. The ring 24 is relatively thin and does not add excessive thickness to the structure so that fastening can be easily achieved for a retrofit mechanism.

Figure 2:
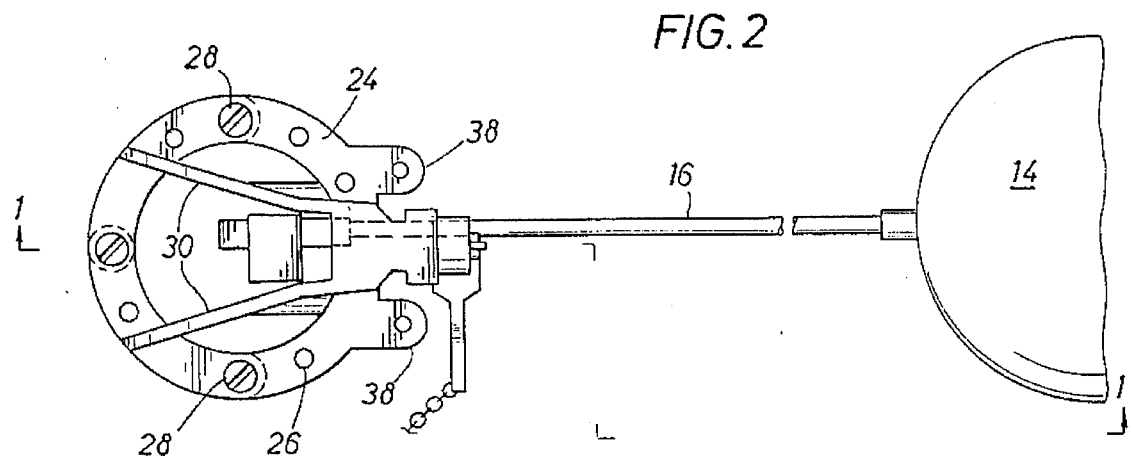
FIG. 2 is plan view of the structure shown in FIG. 1 illustrating the mounting collar which attaches the present invention to the valve mechanism.

The ring 24 supports a pair of angled mounting brackets 30 which are located on the top face of the ring and which extend upwardly as shown in FIG. 1 of the drawings. The mounting brackets converge to support an appended and integrally constructed mounting flange 32 which terminates in a mounting post 34. The post is round and sized to fit another component as will be described and is constructed with a small drilled hole in the end of it. This enables a cotter pin 36 to be inserted. The cotter pin locks the components together so that the post 34 serves as a pivot point as will be described. Continuing however with the description of the apparatus on ring 24, it also incorporates a pair of protruding mounting tabs 38 which are located to the left and right of the mounting post as shown in FIG. 2 of the drawings. It will be appreciated that the mounting post 34 supports something of a load during regular operation and it may be necessary to transfer the weight on the post 34 to the protruding tabs 38. That will be discussed in particular with regard to an extender which is illustrated elsewhere. The reasons for the extender will also be provided. Continuing however with FIGS. 1 and 2, the adapter 10 of the present disclosure is fixedly attached, something as a crown, on the upstanding water pipe 12 with the valve 20 so that the system operates completely above the waterline. Moreover, it is overhead in deployment so that it can reach downwardly to grasp and hold the arm 16 during operation.

Figure 3:
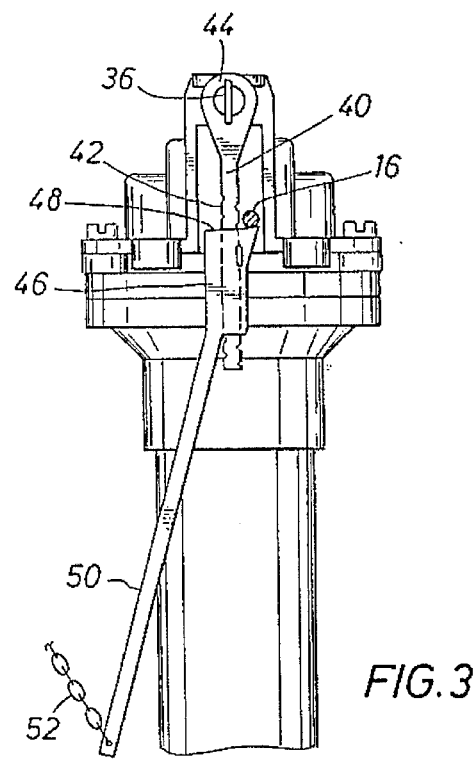
FIG. 3 is a view orthogonal to the structure of FIG. 1 showing the latch mechanism which captures or holds the arm extending to the bulb.

The present apparatus supports a downwardly hanging mounting pendulum 40 better shown in FIG. 3 of the drawings. It is locked in position by the cotter pin 36 as illustrated. It terminates in an eyelet 44 at the upper end. The eyelet is sized to fit around the mounting post with clearance to permit rotation. The pendulum 40 is free to hang vertically. It is free to rotate around the mounting post 34. Along the sides of the pendulum, several notches 42 are formed so that the notches can be used to position and fix in place a surrounding sleeve 4 6. The sleeve is moved upwardly and downwardly. The sleeve supports a laterally extending shoulder 48 which locks in place. The shoulder 48 is a catch or locking mechanism for the arm 16. It is connected with a lever 50 which extends downwardly. The lever 50 enables a flexible link chain 52 to extend to the control mechanism for the water closet. When discharge occurs, this lever 50 is pulled to the side for releasing the arm 16. The lever 50 is incorporated for the express purpose of transferring motion from commode operation to the attachment 10 to release the arm and thereby enable the water level to fall, moving the bulb 14 downwardly and enabling the bulb 14 to float back upwardly.

One aspect of operation involves the setting of the latch whereby the shoulder 48 reaches under the arm and hold as shown in FIG. 3 of the drawings. The arm is held, perched on the shoulder and caught in the V-shaped corner defined by the upstanding pendulum 40 and the shoulder 48. There is some slope, sufficient to hold the arm 48 as illustrated. Furthermore, the shoulder 48 is a faired lateral protrusion better shown in FIG. 3 so the arm, during rotation toward the horizontal position of FIG. 1, slides past the shoulder and reaches a point above the shoulder. In the event of subsequent water loss, the arm then rotates downwardly to the latched position shown in FIG. 3 and thereby locks in position. In particular, this helps hold the float 14 in the up position. Since the arm cannot rotate downwardly any further, no more water is admitted even though leakage may occur. Indeed it is possible for the entire water closet to be drained by chronic small leakage and yet suspend the arm at the illustrated location.

Figure 6:
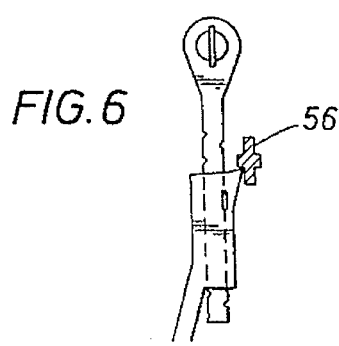
FIG. 6 is a view of an alternate arm construction engaged with the latch mechanism of the present invention.

Attention is momentarily directed to FIG. 6 of the drawings. That shows an alternate form of the arm 16. In that particular embodiment, the arm shown in cross section at 56 to be in the form of an X-shaped extrusion. The arm is caught by the point of the shoulder rather than on the top face of the shoulder.

Figure 4:
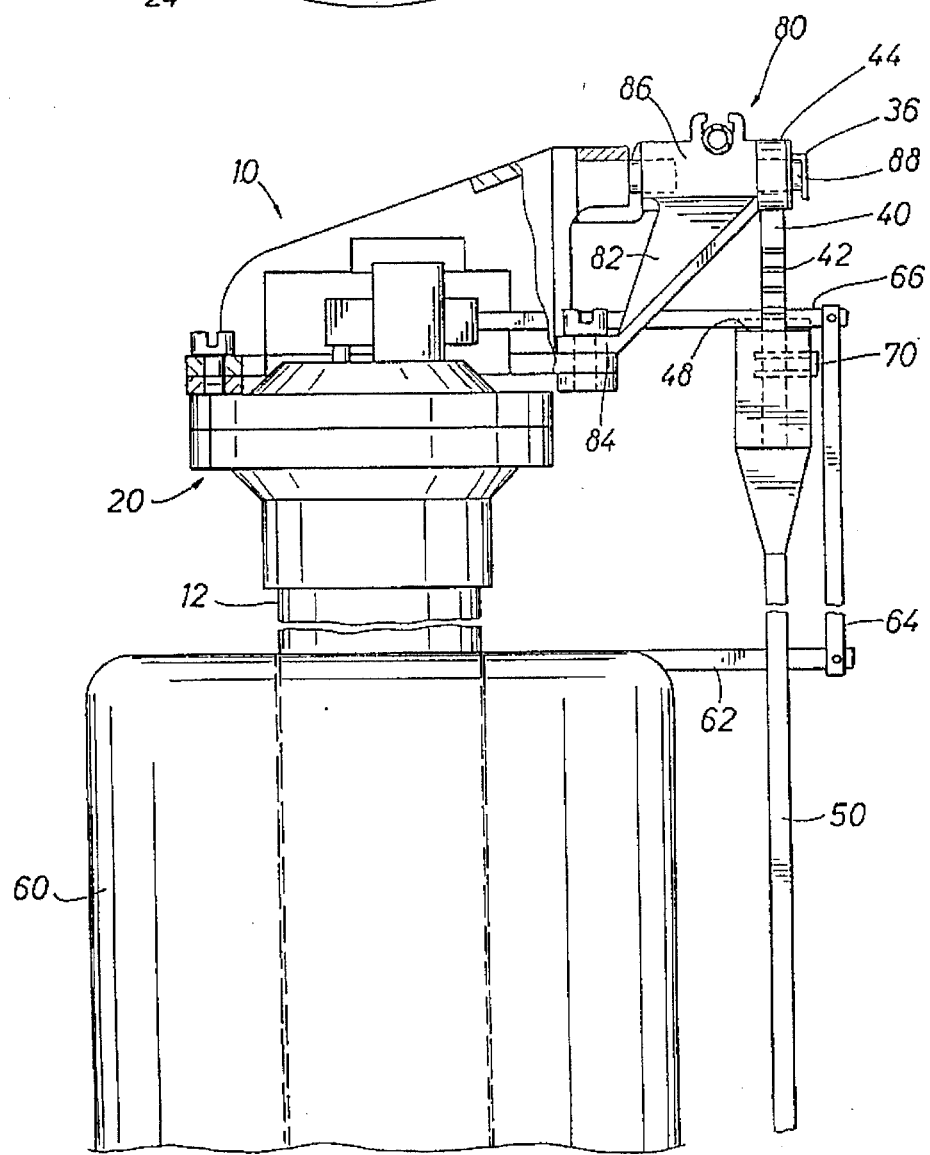
FIG. 4 is a side view of an alternate construction which utilizes a donut shaped float which is positioned around the water inlet pipe and located below the valve for filling the water closet and wherein the present apparatus is mounted on the top to catch the arm connected with the float.

Going now to FIG. 4 of the drawings, the present invention 10 is placed on a different type of water closet valve mechanism and associated float. Again, the water pipe 12 is illustrated. Here, it is connected with the same valve 20 as illustrated in FIG. 1 of the drawings. In this instance, the system operates differently in that the float 60 is a donut which is penetrated with a central opening, and therefore floats on the surface of the water. This causes the float o ride up and down on the pipe 12.

Float motion is transferred by an arm 62 connecting to the float. That connects upwardly through the member 64 and that conveys motion to the arm 66.

Figure 5:
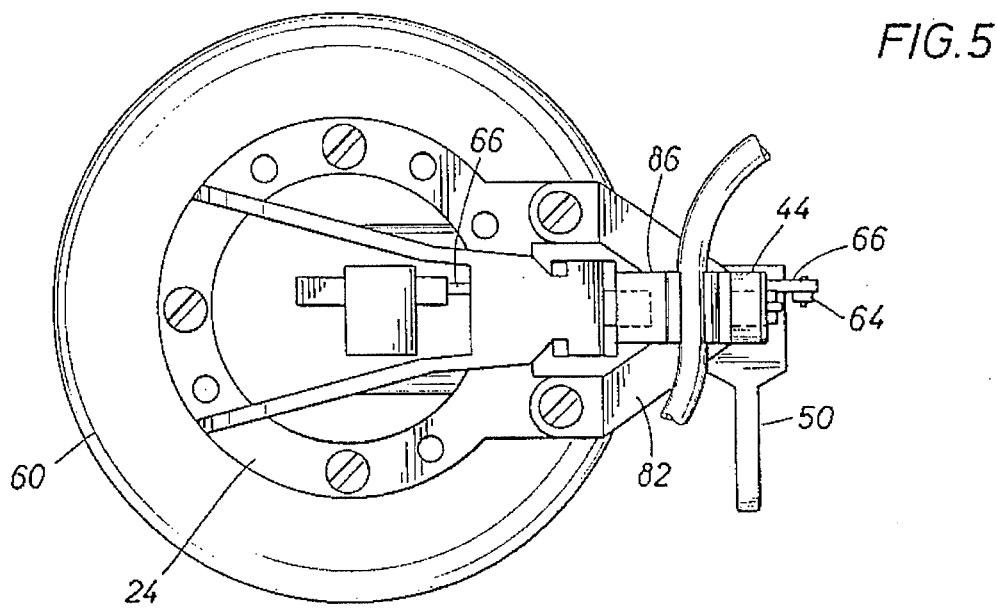
FIG. 5 is plan view of the apparatus shown in FIG. 4.

Continuing further with FIG. 5 of the drawings, the mounting collar 24 is again illustrated. In this instance, it may be mounted using the same or using different mounting openings. Suffice it to say, it is mounted with a set of bolts, etc., so that different manufacturers can be accommodated. The valve mechanism shown in FIG. 4 operates in the same fashion as before, namely, it is operated on rotation of the arm 66. The arm 6 6 responds to the position of the float 60. As before when the float 60 moves upwardly, the valve 20 is operated to stop admitting water.

The apparatus shown in FIGS. 4 and 5 again includes the downwardly hanging pendulum 40 and it also includes the same shoulder 48 which is at the top end of the lever 50. FIG. 4 enhances the detailed presentation by showing how the notches 42 along the pendulum are engaged by a U-shaped cotter pin 70. The cotter pin 70 includes a pair of legs which lock into the notches 42. This places the shoulder 48 at the requisite spacing.

EXTENDER CONSTRUCTION

Attention is directed to an extender 80 shown in FIG. 4. The extender 80 is incorporated optionally with the adapter 10. The extender provides a laterally extending point of connection with the equipment so that the pendulum can hang downwardly but at a greater distance to the side of the water valve 20. The purpose will be explained in details. The extender is constructed with downwardly extending divergent legs 82 which terminate at the mounting tabs 84 shown in FIG. 4. These mounting tabs align with the mounting tabs 38 on the collar illustrated in FIG. 2. Suitable fasteners such as threaded bolts are used to fasten the two divergent legs 82. The extender is constructed with a barrel shaped solid portion 86 which terminates with an opening sized to fit over the mounting post 34. So to speak, the mounting post fits in the facing formed opening and they join together as plug and socket. The extender 80 incorporates a duplicate mounting post 88. As shown in FIG. 4 of the drawings, the mounting post 88 is identical in size to the mounting post 34 shown in the drawings. The primary difference in the mounting post 88 is that it is positioned on a common centerline but removed to the side. Moreover, the mounting post 88 again terminates in a small opening which enables the cotter pin 36 to again be positioned at the end of the mounting post to lock the mounting post to prevent the eyelet 44 from sliding off the mounting post. The eyelet is therefore captured in the same fashion as illustrated in FIG. 1 of the drawings.

The extender can be omitted from the embodiment shown in FIG. 4. In part this depends on the length of the arm 66 and that in turn is related to the diameter of the float 60. Some manufacturers make the float 60 concentric around the pipe 12 and others make it non-concentric. In any event, if the arm 66 is relatively short, the extender can be omitted. This will then locate the pendulum 40 closer to the centerline of the field pipe 12 and fairly close to the pivot at the left end of the arm 66. When that occurs, the torque occasioned by locking the arm in position is increased. In other words, because the pendulum hangs closer to the pivot arm 66, the leverage is reduced but the torque experienced on locking the arm for rotation is increased.

Consider the impact of this equipment particularly with the laterally located bulb 14 shown in FIG. 1 of the drawings. The bulb 14 and the arm 16 are often made of brass which is relatively heavy. If the arm 16 is grasped quite close to the pivot 18 shown in FIG. 1, the vertical loading on the shoulder 48 becomes excessive. It can be changed by moving the point of contact of the shoulder 48 further to the right in FIG. 1. On doing that, the point of contact is moved to the right and the torque required for operation becomes less. In that instance, the extender 80 is particularly useful for extending the point of contact along the arm 16 and thereby enables contact at a different location. As a generalization, the extender 80 is best incorporated where the arm 16 is fairly long. Where the arm 16 is relatively short, extender 80 can be omitted. Whether incorporated or omitted, the pendulum 40 and the latching shoulder 48 which is supported by it operate in the same fashion. They differ primarily in the leverage involved in that particular installation. For that matter, the extender is preferably sold with the adapter 10 and can be discarded at the time of installation if so desired. Indeed, the extender can be made with different lengths so that different manufacturers of commode valves can be accommodated notwithstanding variations in the length of the arm 16, weight of the bulb 14 and other design details which are believed to be well known.

INSTALLATION

Installation of the present equipment is easily accomplished using only a screwdriver. After first turning off the water somewhere, upstream of the commode, the collar 24 is attached with bolts on top of the equipment. The top is usually readily visible and is normally located above the waterline in the water closet. The water closet lid is removed, the bolts that are in the flange 22 are then removed and the collar 24 is then positioned on top of the flange 22. The bolts in the collar shown in FIG. 1 of the drawings are simply inserted back into the flange 22 and fastening is completed. That positions the apparatus so that it can quickly and easily be assembled for grasping the protruding arm. At that juncture, the hanging pendulum. 40 is then installed, the lever 50 is moved upwardly or downwardly on the pendulum as required and is ultimately locked in place with the cotter pin 70. The chain 52 is extended to the control lever for the commode and installation is then complete. The water is turned on for testing and after two or three tests, the device is then ready to operate indefinitely, all for the intended purposes of preventing chronic cumulative water leakage problems.

While the foregoing is directed to the preferred embodiment, the scope is determined by the claims which follow.

We claim:

1. An apparatus for controlling a valve connected to a water fill pipe of a water closet device, comprising:

(a) a mounting collar provided with a mounting surface enabling said collar to be attached to said valve, a bracket extending from said mounting collar, (b) a hanging member hanging from the bracket and being supported by said collar, wherein the hanging member is free to pivot and thereby rotate;

(c) a pivot connection connecting the hanging member to said bracket;

(d) a shoulder being disposed on said hanging member;

(e) a control arm extending from the valve for controlling said valve between a valve closed position and a valve open position by a float member in said water closet device, wherein said control arm is selectively supported on said shoulder; and (f) a release member cooperative with and extending from the hanging member and being responsive to an external control to release said control arm so that said hanging member freely rotates about said bracket so that the float in the water closet is able to rise and fall in response to water level changes in said water closet wherein the release member selectively supports the control arm on said shoulder in the valve closed position to prevent water discharge.

2. The apparatus of claim 1 wherein said hanging member includes a circular eyelet enabling pivotal movement of said member and said eyelet fits around a round mounting post supported by said bracket.

3. The apparatus of claim 2 wherein said mounting post extends horizontally to enable connection to said hanging member, and including a cotter pin securing said post and eyelet in fixed assembly.

4. The apparatus of claim 1 wherein said collar includes a ring having plural openings therein to enable said ring to be attached to the valve.

5. The apparatus of claim 4 further including a cooperative connection to support an extender releasably connected to said mounting post and wherein said extender supports said hanging member at a lateral location from the valve to enable cooperative catching and releasing of said arm.

6. The apparatus of claim 5 wherein said extender has a mounting post for said hanging member, and includes a downwardly deployed leg connected to and anchored on said ring to fasten said extender.

7. An apparatus controlling water flow in a water closet so that a valve in said water closet is operated by a laterally extending arm and the arm is raised by a floating member connected to the arm, comprising:

a) a valve supported attachment having
   1) a fixed member attached to said valve; and
   2) a pivot member extending from said fixed member;
b) a freely rotatable and pivotal, elongate member having an end located eyelet cooperatively mounted on said pivot member so that said rotatable member is able to cooperate with the laterally extending arm; and
c) a protruding shoulder member disposed on said rotatable member so that the laterally extending arm is controllably caught and selectively released by said shoulder member for controlling said valve between opened and closed positions by an external control member cooperatively attached to said elongate member, wherein said shoulder member holds said arm as a result of upward arm movement in response to a floating member being attached to said arm for movement in the water closet as a result of water level changes therein, and said shoulder member holds said arm and said valve in a closed position until released by the rotatable movement of said elongate member when said external control member is actuated.

8. The apparatus of claim 7 wherein said protruding shoulder member comprises a transverse shoulder surface on a slidable sleeve on said rotatable member, said sleeve having a conforming and encircling passage therethrough to enable said sleeve to be positioned controllably along said member to adjust the relative position of said shoulder to said arm so that said arm movement downwardly is limited.

9. The apparatus of claim 8 wherein said laterally extending arm moves downwardly on leakage of water from said water closet, and arm movement is prevented by said shoulder.

10. The apparatus of claim 9 wherein said laterally extending arm movement upwardly moves said arm to a catch position on said shoulder and said shoulder holds said arm thereafter.

11. The apparatus of claim 7 wherein said fixed member includes a flange conformed mounting collar having plural opening therein to enable fasteners to be connected with said collar.

12. The apparatus of claim 7 wherein said pivot member comprises a mounting post having a cotter pin for locking said rotatable member to said post.

13. The apparatus of claim 12 wherein said pivot member connects to a support flange appended on an upstanding structural support above a mounting collar.

14. The apparatus of claim 13 wherein said collar is a surrounding collar centrally open to fit onto a valve flange.

15. The apparatus of claim 7 wherein said rotatable, elongate member connects to a pull chain enabling release of the laterally extending arm.

16. The apparatus of claim 15 wherein said rotatable, elongate member comprises a hanging pendulum connected to a lever, said lever connecting to a pull chain.

17. The apparatus of claim 16 wherein said hanging pendulum includes a set of cotter pin engaging openings along said pendulum and said protruding shoulder member is on a sleeve fastened to said pendulum by a cotter pin.

18. The apparatus of claim 17 wherein said sleeve includes a tapered width below said protruding shoulder member.

\* \* \* \* \*